United States Patent

Hopkins

Patent Number: 5,982,497
Date of Patent: Nov. 9, 1999

[54] MULTI-SPECTRAL TWO-DIMENSIONAL IMAGING SPECTROMETER

[75] Inventor: Mark F. Hopkins, Tucson, Ariz.

[73] Assignee: Optical Insights, LLC, Tucson, Ariz.

[21] Appl. No.: 09/323,331

[22] Filed: Jun. 1, 1999

Related U.S. Application Data

[63] Continuation-in-part of application No. 09/112,538, Jul. 19, 1998, Pat. No. 5,926,283.

[51] Int. Cl.$^6$ .................................................. G01J 3/51
[52] U.S. Cl. .................................... 356/419; 250/226
[58] Field of Search ............................. 356/416, 419, 356/326, 328; 250/226

[56] References Cited

U.S. PATENT DOCUMENTS

| | | | |
|---|---|---|---|
| 3,720,146 | 3/1973 | Yost, Jr. . | |
| 4,072,405 | 2/1978 | Ozeki . | |
| 4,084,180 | 4/1978 | Stoffels et al. | 358/55 |
| 4,134,683 | 1/1979 | Goetz et al. . | |
| 4,141,625 | 2/1979 | Pickar et al. . | |
| 4,268,119 | 5/1981 | Hartmann . | |
| 4,272,684 | 6/1981 | Seachman | 250/578 |
| 4,281,339 | 7/1981 | Morishita et al. | 358/52 |
| 4,531,054 | 7/1985 | Suzuki | 250/201 |
| 4,573,195 | 2/1986 | De France | 382/6 |
| 4,650,321 | 3/1987 | Thompson | 356/73 |
| 4,743,112 | 5/1988 | Burke | 356/326 |
| 4,746,798 | 5/1988 | Amon et al. | 250/339 |
| 4,786,813 | 11/1988 | Svanberg et al. | 250/461.1 |
| 4,916,529 | 4/1990 | Yamamoto et al. | 358/50 |
| 4,933,751 | 6/1990 | Shinonaga et al. | 358/55 |
| 5,024,530 | 6/1991 | Mende | 356/402 |
| 5,059,026 | 10/1991 | Zoechbauer | 356/346 |
| 5,149,959 | 9/1992 | Collins et al. | 250/226 |
| 5,153,621 | 10/1992 | Vogeley | 353/30 |
| 5,194,959 | 3/1993 | Kaneko et al. | 358/225 |
| 5,216,484 | 6/1993 | Chao et al. | 356/326 |
| 5,225,888 | 7/1993 | Selwyn et al. | 356/346 |
| 5,225,893 | 7/1993 | Whitney et al. | 356/407 |
| 5,251,008 | 10/1993 | Masutani | 356/346 |
| 5,260,767 | 11/1993 | Cook | 356/326 |
| 5,276,321 | 1/1994 | Chang et al. | 250/226 |
| 5,414,458 | 5/1995 | Harris et al. | 348/92 |
| 5,461,477 | 10/1995 | Marineeli et al. | 356/352 |
| 5,479,015 | 12/1995 | Rudman et al. | 250/332 |
| 5,526,119 | 6/1996 | Blit et al. | 356/402 |
| 5,539,483 | 7/1996 | Nalwa | 353/94 |
| 5,561,521 | 10/1996 | Chase et al. | 356/346 |
| 5,587,784 | 12/1996 | Pines et al. | 356/4.01 |
| 5,642,191 | 6/1997 | Mende | 356/326 |

*Primary Examiner*—F. L. Evans
*Attorney, Agent, or Firm*—Antonio R. Durando

[57] ABSTRACT

A multi-spectral two-dimensional imaging spectrometer includes a combination of achromatic, well-corrected lenses for imaging a two-dimensional scene on an internal field stop. The light emanating from this intermediate image is collimated with another well-corrected lens. A spectral separation subassembly consisting of multiple dichroic filters divides the incident light into multiple, identical, and independent arms. The light in each arm is spectrally filtered based on the properties of the dichroic filters in the separation subassembly. An re-imaging subassembly composed of a well-corrected lens forms contiguous images onto a single two-dimensional detector array. The images are identical copies of the original object with each copy having a different spectral component and can be viewed on a standard monitor or alternatively on a computer employing an analog-to-digital conversion device.

18 Claims, 7 Drawing Sheets

MULTI-SPECTRAL TWO-DIMENSIONAL IMAGING SPECTROMETER

RELATED APPLICATIONS

This is a continuation-in-part application of U.S. Ser. No. 09/112,538, filed Jul. 9, 1998, now U.S. Pat. No. 5,926,283.

BACKGROUND OF THE INVENTION

1. Field of the Invention

This invention pertains broadly to the area of spectroscopic systems and imaging spectrometry where multiple images of an object are formed corresponding to different spectral components of the object. More specifically, the invention relates to a novel imaging spectrometer designed to acquire simultaneous, spectrally-discrete, two-dimensional images in real time while maintaining the spatial integrity of the image without using scanning mechanisms or mathematically intensive reconstruction/registration algorithms.

2. Description of the Related Art

Spectroscopic systems are optical systems that allow for the determination of the spectral (wavelength) composition of objects and scenes. Generally, these systems collect the total energy coming from the object. The wavelengths that comprise the collected energy are separated with the use of a dispersive element employing refractive means such as a prism or diffractive means such as a grating. After passing through one of these dispersive elements, the different wavelength components of the wavefront propagate in different directions and their intensities are recorded by a one-dimensional array of detector pixels.

Fairly complicated spectroscopic systems have been developed in the prior art. For example, U.S. Pat. No. 5,149,959 and No. 5,276,321 describe multichannel systems for the detection of the wavelength composition of an objects. U.S. Pat. No. 5,251,008, No. 5,561,521, No. 5,461,477, No. 5,225,888, and No. 5,059,026 employ interferometric methods for determining the spectral content of an object or scene. U.S. Pat. No. 4,743,112 and No. 5,260,767 disclose elaborate examples of systems wherein an imaging component forms the image of an object onto a slit aperture and the resulting one dimensional line image is collimated by a lens and dispersed by a grating or prism in a direction perpendicular to the line image. The dispersed light is then imaged onto a two-dimensional detector array.

U.S. Pat. No. 5,216,484 describes an acousto-optic tunable filter-based imaging spectrometers. U.S. Pat. No. 4,134,683 uses multiple channels, where each consists of a lens system, a spectral filter and a detector array. U.S. Pat. No. 4,268,119, No. 4,084,180, No. 4,072,405 and U.S. Pat. No. 4,916,529 use a single optical system in conjunction with a multiple prism assembly. U.S. Pat. No. 5,414,458 utilizes cube beamsplitters instead of prism assemblies. U.S. Pat. No. 4,281,339 and No. 4,531,054 utilize a series of dichroic beamsplitters to propagate the incident light in different directions.

U.S. Pat. No. 4,650,321 discusses a multiple detector system where two detector arrays are used in combination with a dispersive imaging system. U.S. Pat. No. 3,720,146 describes the use of four lenses arranged in a parallelogram configuration to simultaneously produce four images on a film plane. U.S. Pat. No. 5,479,015 also implements multiple focusing members to form a plurality of identical images on a single detector array. U.S. Pat. No. 4,141,625 discusses the use of two partially reflecting mirrors in combination with a single lens system to create two images of an object on a single detector array. U.S. Pat. No. 4,272,684 uses a reflective prism configuration to function as a beamsplitter.

Filter wheel systems have also been used as a means of obtaining spectral images using a single detector, as disclosed in U.S. Pat. No. 5,587,784. U.S. Pat. No. 4,933,751 describes a tri-color separating system which uses four dichroic beamsplitters to form three separate color images right next to each other at an image plane. U.S. Pat. No. 4,786,813 disclose a method for producing two-dimensional, spectrally discrete images on a single detector array by employing a segmented concave mirror. Finally, U.S. Pat. No. 5,024,530 discusses a telecentric, filtered imager capable of producing only two spectral images of an object; U.S. Pat. No. 5,642,191 discloses a very similar approach. U.S. Pat. No. 5,526,119 utilizes multi-faceted prisms to overcome the limitation of two-band imaging and obtain more images.

These prior-art systems are not capable of performing two-dimensional, real-time imaging spectrometry; many require mechanical or electrical scanning and often also require application specific, computationally intensive, system matrices. Therefore, there is still a need for an imaging spectrometer that does not suffer from these drawbacks. This invention is directed at providing an apparatus and a related spectrometric approach to fulfil that need.

BRIEF SUMMARY OF THE INVENTION

An objective of this invention is a spectrometer that is capable of two-dimensional, real-time imaging spectrometry, with sub-pixel registration of the images.

Another objective is a spectrometer that operates without the use of mechanical or electrical scanning.

Yet another goal is a spectrometric arrangement that does not require the use of application specific, computationally intensive, system matrices.

Finally, another goal is the implementation of the above mentioned objectives in a commercially viable system that maximizes the utilization of existing technology and results in economic, compact, commercially viable products.

Therefore, according to these and other objectives, the present invention consists of a combination of single or multi-element, achromatic, well-corrected lenses for imaging a two-dimensional scene on an internal field stop. The light emanating from this intermediate image is then collimated with another multi-element, achromatic, well-corrected lens. A spectral separation subassembly that divides the incident light into multiple, identical, and independent arms is placed in the collimated space following the collimating lens. The light in each arm is spectrally filtered based on the properties of an interference filter in each arm. Finally, an imaging subassembly composed of a single multi-element, achromatic, well-corrected lens system forms contiguous images onto a single two-dimensional detector array. The images are identical copies of the original object with each copy having a different spectral component and can be viewed on a standard monitor or alternatively on a computer employing an analog-to-digital conversion device.

Thus, the spectrometer produces simultaneous, spectrally discrete, two-dimensional images that can be acquired in real time. The system is capable of simultaneously forming two or more spectral images on a single detector plane with minimal image degradation caused by aberrations and with no optical dispersion due to the spectral separation assembly.

Problems with image registration are minimized because each spectral channel propagates through a common set of optics eliminating boresight errors common to multiple channel systems. External mechanical adjustments in the spectral separation subassembly allow alignment capability of images to achieve registration to within one pixel. Thus, the device is extremely flexible and can be used with various camera mounts, camera lenses, and more complicated optical systems. In addition, the spectral filters are easily interchanged allowing spectral imaging over any wavelength region.

Various other purposes and advantages of the invention will become clear from its description in the specification that follows. Therefore, to the accomplishment of the objectives described above, this invention consists of the features hereinafter illustrated in the drawings and fully described in the detailed description of the preferred embodiment and particularly pointed out in the claims. However, such drawings and description disclose but some of the various ways in which the invention may be practiced.

DESCRIPTION OF THE PREFERRED EMBODIMENTS OF THE INVENTION

The heart of this invention lies in the improvements derived in a two-dimensional imaging spectrometer, wherein the image of an object is divided by a reflective prism and filtered into spectral components, by providing a pupil relaying optic for imaging the exit pupil of the preceding optics at a plane coincident with the apex of the prism; by providing an aperture stop at that same plane; and by imaging each spectral component on a detector through a single optical lens placed symmetrically on-axis.

In all figures used to illustrate this disclosure, the coordinates x and y are used to describe the plane orthogonal to the main optical axis of the spectrometer, x and y corresponding to the horizontal and vertical directions, respectively. The z coordinate corresponds to the direction along the optical axis of the device.

For the purposes of this disclosure, an optical filter is defined as any component, such as a spectral or neutral-density filter or a polarizer, that modifies the optical characteristics of an incident wavefront. The optical state of a wavefront is defined as the combination of the wavefront's intensity, phase, polarization and wavelength.

Figure 1:
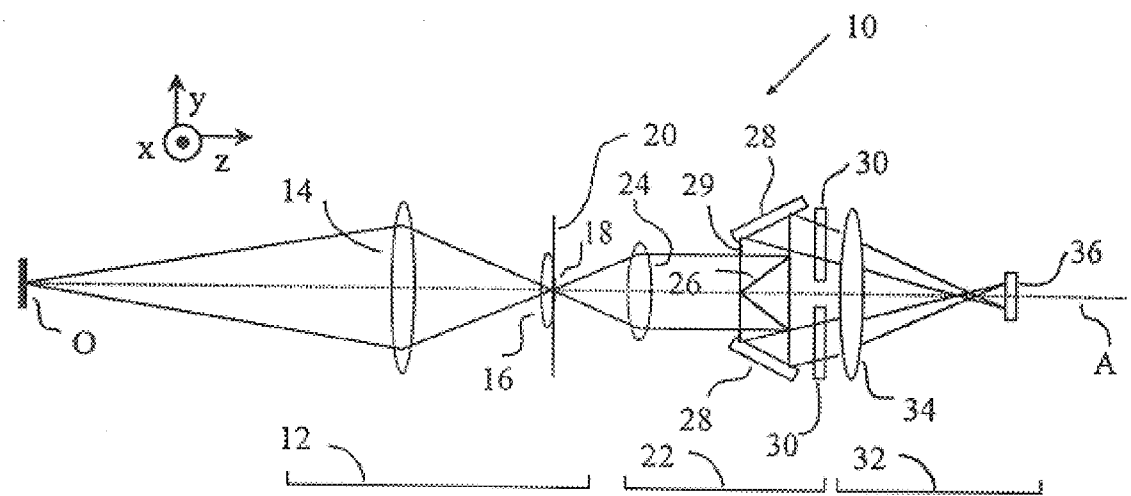
FIG. 1 is a schematic representation of the y-z cross-section of an imaging spectrometer according to the preferred embodiment of the invention consisting of a multi-faceted reflecting component, a single lens re-imaging assembly and a single 2-D detector array.

Referring to the drawings, wherein like reference numerals refer to like parts throughout, FIG. 1 is a schematic view of a two-dimensional imaging spectrometer 10 according to the invention. The figure illustrates a y-z cross-section of the system, which is symmetrical about its optical axis A aligned with the x coordinate. As will become clearly understood from this disclosure, the degree of the symmetry depends upon the number of spectral-separation channels in the system, which in turn depends on the number of facets of the reflecting prism.

For clarity of description, the spectrometer 10 is characterized as consisting of three distinct functional subassemblies. An image-collection subassembly 12 is first provided to produce an intermediate two-dimensional image of a test object O within a field-stop aperture in the system. The image-collection subassembly 12 includes three distinct components. An achromatic, aberration corrected, possibly multi-element optic 14 and a single or multi-element optic 16 are used to produce a chromatically and spatially well-corrected intermediate image 18 of the object O in the same plane as an adjustable square/rectangular/circular field-stop aperture 20 (placed normal to the optical axis of the system). According to a novel aspect of the invention, the element 16 of the preferred embodiment is a pupil relaying optic to image a pupil plane at the location of the spectral separation component of the spectrometer, as described in detail below. The adjustable aperture 20 functions as a field stop rejecting stray and scattered light and serves to properly size the spectral images on a detector downstream. The aperture 20 is preferably made adjustable so that the system can be used with any size detector array. Without this field stop, the spectral images would overlap at the detector plane rendering the system useless.

The second group of components constitutes a spectral-separation subassembly 22 provided to separate the image 18 produced by the image-collection subassembly into its different spectral components. The spectral-separation subassembly 22 includes an achromatic, aberration-corrected, possibly multi-element optic 24, a multi-directional reflecting element 26, a group of flat, highly reflective surfaces 28 and an assembly 30 of removable spectral filters. The component 24 is an optic with a positive focal length that collimates the light coming from each point in the plane of the intermediate image 18. The light then strikes the multi-directional reflecting element 26 through an aperture stop 29 limiting the collimated space to an area no greater than the size of the reflecting element 26, so that no light passes past the element 26 without striking it. The element 26 is preferably a multi-faceted prism constructed such that its multiple sides are triangular and connect to form an apex. The prism 26 is oriented with its apex facing towards the incident light, coincident with the system's optical axis A, and in the same plane as the aperture-stop 29 and the exit pupil plane of the preceding optical system relayed by the optic 16. For the purpose of this disclosure, the exit pupil of the preceding optical system is defined as the exit pupil of the optical system comprising optics 14, 16 and 24, and/or any other optics that may be used to provide a pupil plane at the apex of prism 26. Each side of the prism 26 that connects to form the apex is coated to be highly reflective and forms a front-surface reflector. As illustrated in FIG. 1, each triangular side reflects a portion of the incoming light into a direction that is preferably orthogonal to the incident direction.

Alternatively, a truncated prism with equal quadrilateral sides could be used instead of prism 26 (that is, a prism truncated at a face parallel to the prism's base, herein defined as the top surface of the truncated prism). The truncated prism would similarly be oriented with its top surface facing towards the incident light, with the axis of the truncated prism coincident with the system's optical axis A, and preferably with the top surface in the same plane as the aperture-stop 29 and the exit pupil of the preceding optical system relayed by the optic 16, as defined above. In view of the functional equivalence of this alternative embodiment, the term prism, as used herein, is intended and hereby defined to refer to either a prism or a truncated prism.

Thus, the prism 26 acts as a beam division mechanism for the imaging spectrometer. Each separate beam reflected from the prism is then further reflected by a corresponding mirror 28 toward a predetermined area on a detector array and filtered by a corresponding optical filter in the filter assembly 30 adapted to transmit only a selected waveband. Each reflecting component 28 has external tip and tilt mechanical adjustments (not shown in the figures) for accurate placement of the images onto the detector. Once mechanical alignment is accomplished, image registration is automatic without the need for any image processing. In order to ensure that the original beam is divided equally, the prism must be positioned exactly coaxially with the optical axis, and its top surface/apex must be coincident with the plane of the aperture stop 29 (which is also the exit pupil plane) so that the energy incident on the reflective surfaces is divided equally among various channels for each field point.

According to another novel aspect of the invention, when the multi-spectral imaging system 10 is used by itself, the operating f/number of the optic 14 is selected to make the multi-faceted prism 26 the aperture stop of the system. When the multi-spectral imaging system is used in conjunction with another optical system (that is, without element 14 in the figures), the exit pupil of the external optical system has to be imaged at the location of the multi-faceted prism 26 in order to ensure even division of the incident light. This is the primary function of the optic 16. By choosing the appropriate focal length for this lens, the exit pupil of the external optical system is imaged at the location of apex/top surface of the multi-faceted prism 26 to ensure optimal operation of the system.

It is noted that the inclusion of the pupil relaying optic 16 in the system to place the pupil at the apex/top surface of the prism represents a significant improvement over the prior art because it provides for the equal distribution of the energy of the incident beam into the various channels of the optical system. In addition to achieving inter-image uniformity, forcing this location of the pupil at the prism (i.e., the location of the beam division) ensures that parallax errors are eliminated. This is extremely important in order to achieve sub-pixel registration of the various images produced by the spectrometer for downstream data processing, if necessary. Another important element of the design of the invention is the fact that the beam division is performed by way of reflection instead of refraction. Reflection, unlike refraction, is an achromatic process. That is, reflection has no wavelength dependence, so that splitting the light in this manner alleviates the optical dispersion problems associated with systems that use prisms in transmission to perform the beam division.

A re-imaging subassembly 32 utilizes independent and spectrally filtered beams to produce multiple, spatially identical, but spectrally discrete, images of the original object onto a single two-dimensional detector array. The re-imaging subassembly 32 comprises an imaging optic 34 and a detection system 36. The optic 34, which may be multi-element, is located past the removable filter assembly 30 and focuses the filtered light to form multiple discrete images on the detector array 36, with each image containing different spectral components. These images are then viewed on a monitor or recorded by a computer connected to the detector (not shown in the figures).

According to yet another aspect of the invention, the optic 34 consists of a single element placed symmetrically on-axis, such that its optical characteristics and defects/aberrations affect all channels equally. This allows for the use of a single detector 36, improves the quality of the images formed on the detector, and further facilitates the registration of the images for data storage and processing because each spectral image has identical optical properties and identical noise and gain properties.

Figure 2:
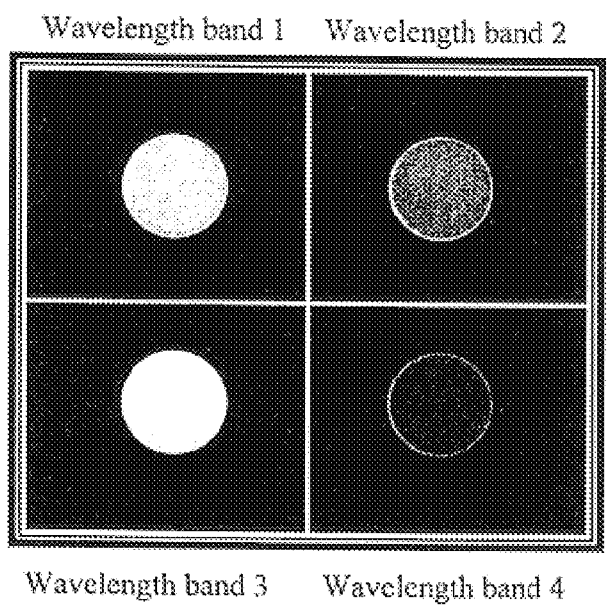
FIG. 2 is a multi-spectral image of a circular spot produced by the invention utilizing a four-facet reflecting component.

Supposing, for example, that the object O were a circle, its spectrum contained multiple wavelengths, and the prism 26 were pyramidal with four highly reflective sides, there would be four-fold symmetry about the optical axis of the instrument and the output from the detector array, as seen on the monitor, would appear as shown in FIG. 2. Thus, by splitting the light as described, the optical system of the invention features multiple, separate and independent arms. For example, if the multi-faceted prism 26 were provided with eight highly reflective sides (i.e., eight-fold symmetry), eight, separate and independent arms would result. In each of these arms, the system includes a flat, externally adjustable, highly reflective surface that steers each divided beam of light towards the removable filter assembly 30, which contains as many filters as there are independent arms. Each filter allows the transmission of different spectral components of the incoming light.

It is important to note that the entire spectral separation mechanism 30 is located in a collimated space such that all the light from a particular point in the plane of the intermediate image 18 sees the same wavelength bandpass in its respective spectral channel (i.e., there is no bandpass variation with numerical aperture). The removable filter assembly 30 is preferably designed to accommodate individual one-inch square or circular filters that can be easily interchanged allowing for the formation of spectral images corresponding to any desired bandpass.

Figure 3:
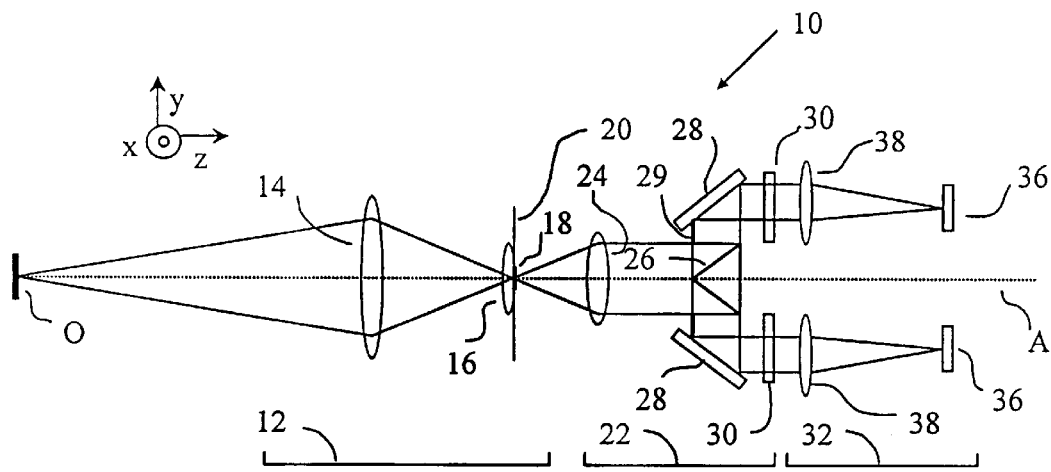
FIG. 3 is a schematic y-z cross-section representation of an alternative imaging spectrometer according to the invention consisting of a multi-faceted reflecting component, a multiple-lens re-imaging assembly and multiple 2-D detector arrays.

In an alternative embodiment of the invention shown in FIG. 3, the re-imaging subassembly 32 comprises multiple imaging lenses 38 focusing each arm onto a separate sensor 36, one for each of the spectral images produced by the spectrometer. While prior-art devices have utilized multiple imaging lenses and mirror assemblies to both divide the pupil and form the images on the detector, the approach has had a serious disadvantage in the fact that it is very difficult to properly correlate and register the images. This is due to boresight errors which result from the fact that the individual lenses cannot physically occupy the exact same location, so each lens sees the object at a different angle. Effectively, each lens sees a different object. To overcome this problem, the present invention utilizes a separate subassembly to perform the pupil division/spectral separation, so that misalignment of the focusing elements will not lead to boresight/parallax errors. This important distinction, in combination with the reflective spectral separation subassembly 22, represents a significant advantage over existing technology.

It is noted that multi-faceted reflective prisms have been used before for other applications. A variety of configurations have been designed where the prism is used for beam division to place different portions of the field of view of an optical system onto different detectors (see, for example, U.S. Pat. No. 5,194,959 and No. 5,539,483. These are different applications than disclosed here. In order to split the field of view of a system, the beamsplitting assembly is necessarily not located at a pupil plane. In contrast, the subject of the present invention is the replication of the field of view of the optical system, not its division.

Multi-faceted prisms have also been employed in illumination systems so that one light source can be used to illuminate more than one object. U.S. Pat. No. 5,153,621 discusses such a configuration for placing the images of different objects adjacent to each other at an image plane. The prism/multiple lens assembly is simply being used to channel light into different arms to illuminate different objects. The prism is not specifically located in a pupil plane for the purpose of replicating images of the same object. Separate images of the source are not being formed at any image plane of the projection system. Instead, overlapping images of the source are being formed in the exit pupil of the projection system. In addition, the concept disclosed in U.S. Pat. No. 5,153,621 works only if specific segments of the clear aperture of each of multiple lenses can be used. A single whole lens cannot be used to achieve the same effect.

Figure 4:
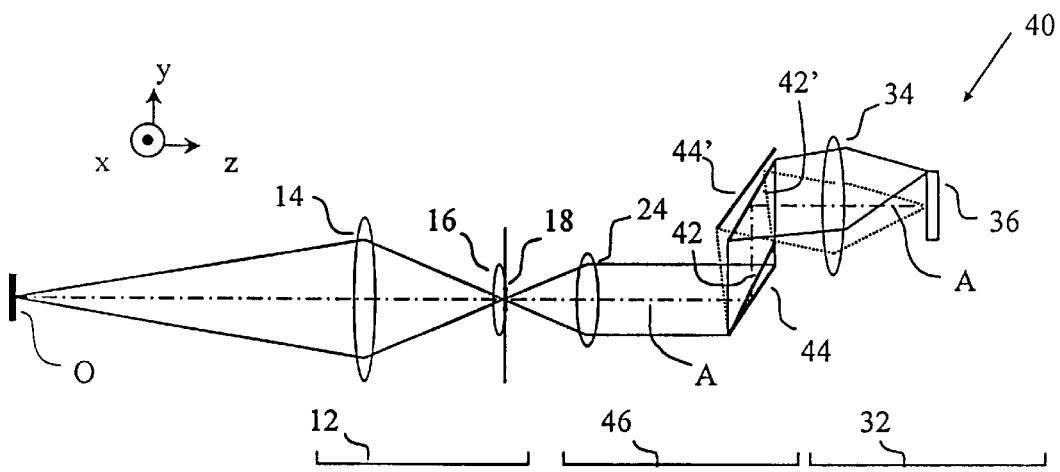
FIG. 4 is an imaging spectrometer according to another embodiment of the invention utilizing an interference filter spectral separation subassembly.

In another embodiment 40 of the present invention shown in FIG. 4, a different approach is used to produce the separation of the image 18 into its spectral components. Instead of using a pyramid-prism/optical-filter combination, the beam division and spectral filtering functions are combined by employing a set of interference filters 42 and a corresponding set of flat reflecting surfaces 44 in the collimated space between the optics 24 and 34. Reflection is still the main mechanism by which the beams are divided; however, interference filters are used as beamsplitters to split the beams in a spectrally selective manner. The main advantage of this configuration is that it is a more radiometrically efficient design than the first embodiment. However, the use of interference filters can make the system less compact; therefore, it is not preferred in most instances.

As well understood in the art, an interference filter generally consists of a multi-layer coating on a glass substrate. It is designed to reflect certain wavelengths of light while transmitting others. Specifically, the wavelengths that are transmitted and those that are reflected depend on a number of physical parameters including the admittance of the substrate, the admittance of the layers in the coating, and the number and thickness of the layers. The angle of the filter with respect to the incident radiation also affects the wavelengths that are transmitted and reflected. Depending on the polarization of the radiation, the bandpass of the filter will shift to longer or shorter wavelengths as the angle between the filter and the incoming radiation increases.

Thus, the spectral separation capability of the interference-filter subassembly 46 depends on the use of specially designed interference filters 42 and on the fact that the bandpass of each filter changes with the tilt angle of the filter. The operation of this subassembly can be understood by considering the light coming from a single point in the plane of the intermediate image 18, as shown in FIG. 4. The incident light, which is composed of a number of different wavelengths, is collimated by the optic 24. The collimated light strikes a first interference filter 42, which is tilted about the x-axis at a particular angle (nominally 45 degrees) with respect to the incoming light. This first filter 42 functions as a long-pass filter, reflecting shorter wavelengths and passing longer wavelengths, thereby splitting the light into two beams, each with different spectral components. Directly behind the first interference filter 42 is a reflective flat 44 tilted about the x-axis at a slightly greater angle than interference filter 42. The transmitted light strikes the flat reflecting surface 44 and is directed upward in the same fashion as the initially reflected light. This light passes through the interference filter 42 a second time essentially unaffected. For optimal performance, in this embodiment of the invention the pupil relaying optic 16 is adapted to image an exit pupil of preceding optics at a plane coincident with the plane of the focusing optic 34.

Thus, the first half of the spectral-separation subassembly 46 splits the input light into two spectrally different beams propagating toward a second interference filter 42'. The filter 42' is also tilted about the x-axis (nominally 45 degrees) and it has a different transmission curve. For simplicity of explanation, assume for example that the short wavelength beam that comes from the first filter consists of blue light and green light, while the long wavelength beam consists of orange light and red light. The transmission of the second filter 42' would then be selected such that the green light of the short wavelength beam and the orange light of the long wavelength beam are passed while the blue light of the short wavelength beam and the red light of the long wavelength beam are reflected. As with the interference filter 42, a flat reflecting surface 44' is located behind the interference filter 42'. This surface is tilted about the x-axis at a slightly greater angle than the interference filter 42'. It is also tilted about the y-axis to provide separation in the other direction (i.e. along the x-axis). The green and orange light passed by the interference filter 42' is reflected by the mirror 44' so that these beams are passed back through the second interference filter 42' towards a focusing optic 34.

Thus, four beams are produced having different spectral components propagating at different angles toward the re-imaging subassembly 32. The optic 34, which may be multi-element, focuses each beam onto the detector array 36, as in the first embodiment of the invention. Since the beams are propagating at different angles, by the time they reach the detector array each beam will be spatially separated. Obviously, this entire explanation can be extended to all the points at the intermediate image plane. Therefore, the initial image 18 is decomposed into four well-corrected, spatially-identical images; one being blue, one green, one orange, and one red (or consisting of four other spectral components, depending on the characteristics of the interference filters). The result, seen in FIG. 2, is the same as for the embodiment depicted in FIG. 1. Since FIG. 4 is a two-dimensional drawing, it only shows two beams and cannot depict their separation into four independent beams.

It is noted that the flat reflecting mirrors 44 and 44' described in this embodiment could alternatively be replaced with other interference filters to afford additional spectral filtering.

Therefore, as in the embodiment of FIGS. 1 and 3, the interference filter version of the multi-spectral 2-D imaging spectrometer of the invention can also be used to acquire more than four spectral images. In the first two embodiments, more spectral images could be acquired by increasing the number of reflective facets of the prism 26 and by adding a corresponding number of flat reflective surfaces and filters. In the alternative embodiment of FIG. 4, more spectral images can be acquired by adding the appropriate number of interference filters with the desired transmission properties.

Figure 5:
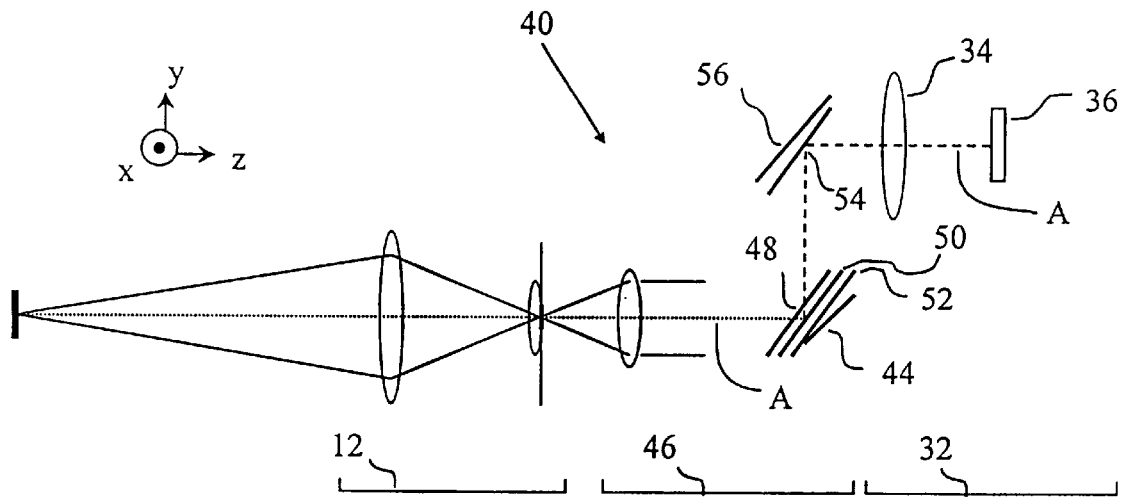
FIG. 5 is an imaging spectrometer with a multiple-interference filter spectral separation subassembly for obtaining more than four spectral images.
Figure 6:
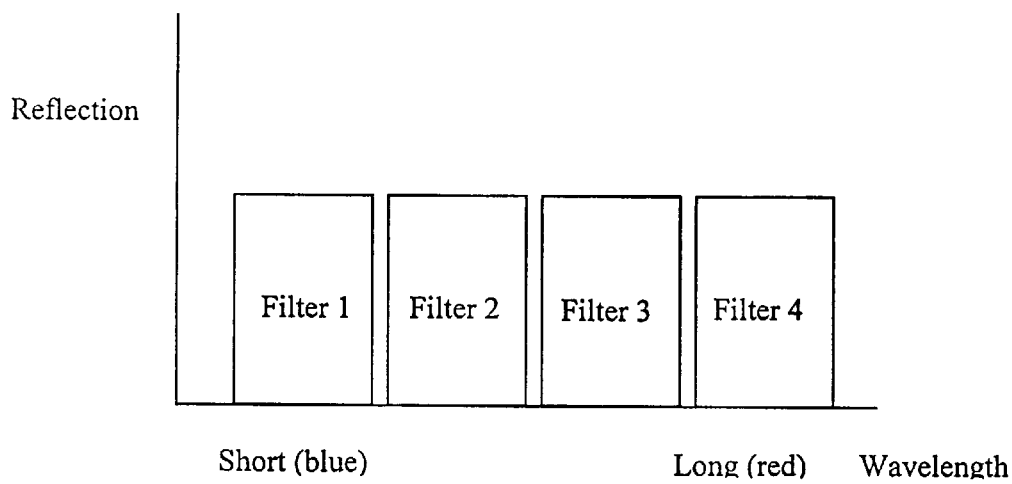
FIG. 6 is a qualitative depiction of the reflection bands of the first interference-filter component used in the embodiment of FIG. 5.
Figure 7:
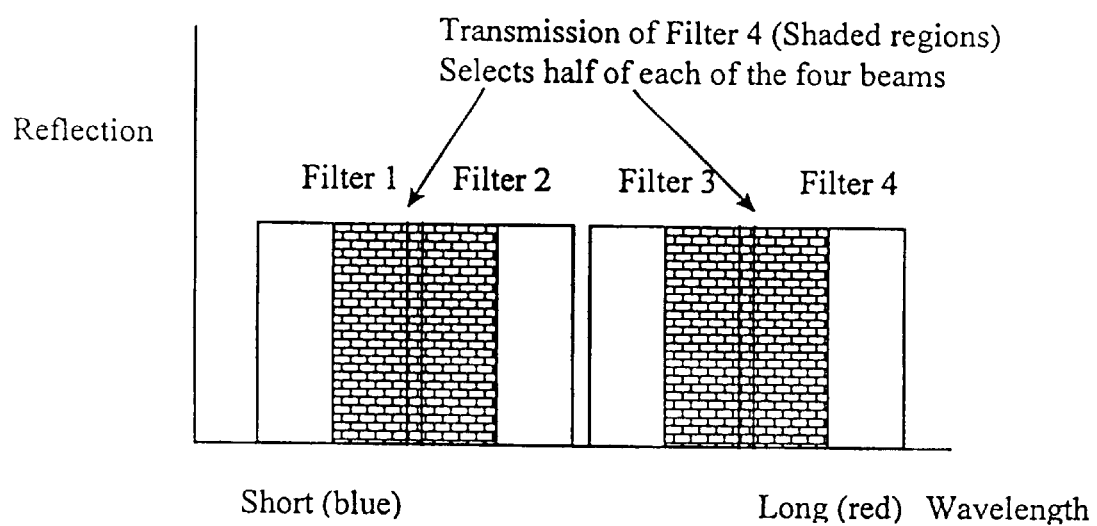
FIG. 7 is a qualitative depiction of the reflection bands of the second interference-filter component used in the embodiment of FIG. 5 overlaid on the reflection bands of first interference-filter component.
Figure 8:
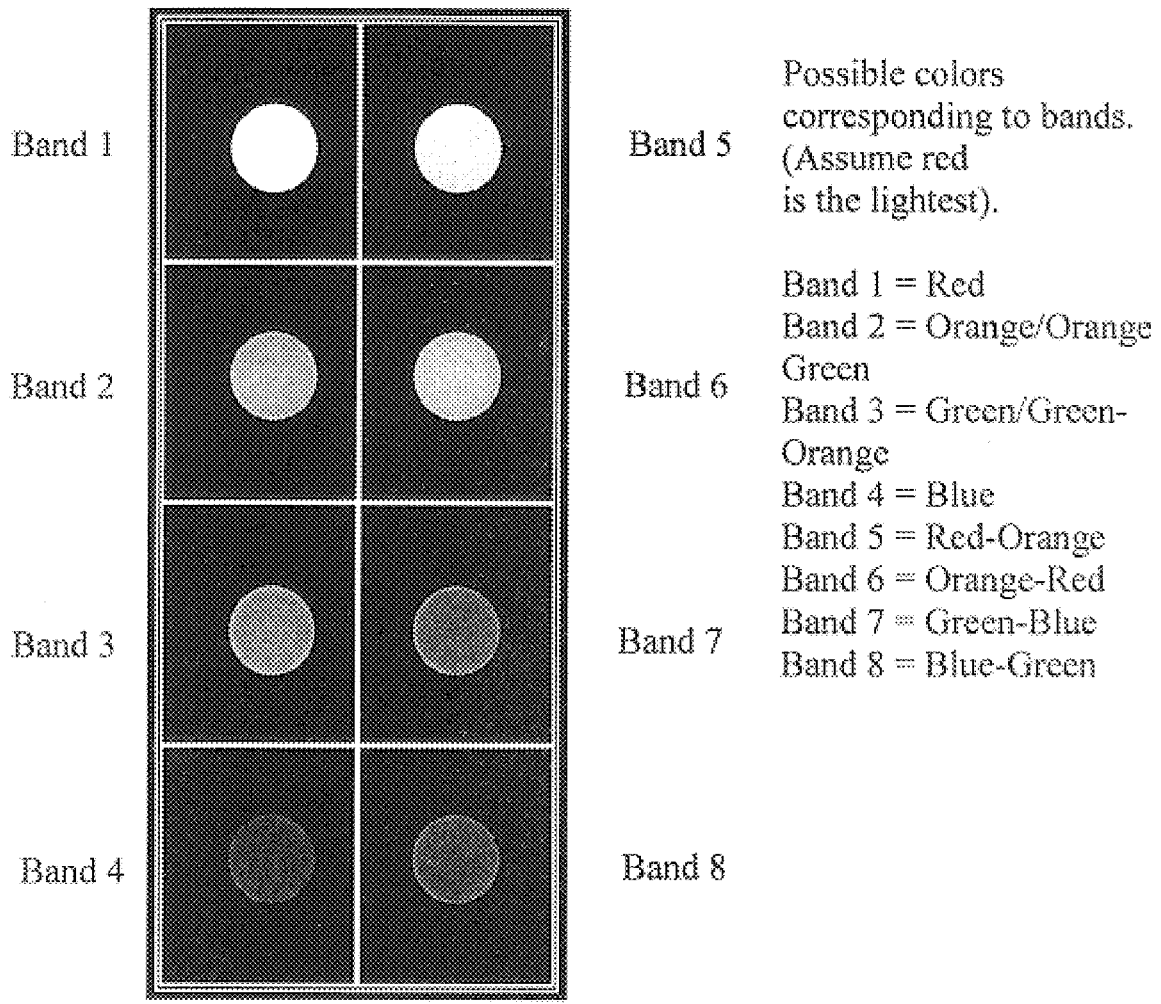
FIG. 8 is an illustration of the output of a detector of an imaging spectrometer with multiple interference filters.

For instance, the system illustrated in FIG. 5 shows three interference filters 48,50,52 in front of the first reflecting surface 44. As in the four-color example, these filters are tilted about the x-axis with each filter at a slightly different angle, so that the spectral images will be spatially separated at the detector 36. The reflection bandpass of each filter is illustrated qualitatively in FIG. 6. After this first train of three interference filters 48,50,52 and the flat reflecting surface 44, the initial beam has been split into four beams each having different spectral components of the original light and propagating toward a fourth interference filter 54. FIG. 7 illustrates the reflection bandpass of interference filter 54 overlaid on the bandpasses of interference filters 48,50, 52. All the wavelengths in the shaded blocks (4 blocks) are reflected by interference filter 54, and all the wavelengths in the unshaded blocks (4 blocks) are transmitted. The light transmitted by the filter is reflected by the flat reflecting surface 56 (which is tilted about x and y) past the interference filter 54, so that these beams are directed back and transmitted through the interference filter 54 towards the re-imaging subassembly 32. Thus, eight beams having different spectral components propagate at different angles toward the multi-element optic 34, which focuses each beam onto the detector array 36. Since the beams are propagating at different angles, by the time they reach the detector array each beam will be spatially separated. Therefore, the initial image is decomposed into eight well-corrected, spatially-identical images as shown in FIG. 8. Again, since FIG. 5 is a two-dimensional drawing, it does not depict the separation of the one initial beam into eight independent beams.

For this embodiment, the incorporation of a pupil relaying optic 16 is again a significant improvement over prior art for the same reasons mentioned with regards to the preferred embodiment. In the alternative embodiment, however, the pupil relaying optic 16 is used to image the exit pupil of the preceding optical system at the location of the final imaging lens 34. Specifically, by imaging the exit pupil of the preceding optics at this location, vignetting (light loss as a function of field) is significantly minimized, improving energy throughput and optimizing image registration.

For both the four-band and eight-band examples discussed above, the drawings show that there are two filter assemblies within the spectral separation subassembly. In the preferred embodiments of invention these filter assemblies consist of removable modules that allow an operator to easily set the desired bandpass of the spectral images. It is noted that in all embodiments the spectral separation is achieved without the use of any moving parts, thus alleviating any potential image registration problems. In addition, no algorithms are necessary for reconstructing the spectral images. Aside from the fact that no scanning is required, these designs have excellent radiometric throughput keeping the signal-to-noise ratio high. All embodiments are compact designs that make the imaging spectrometer system portable, allowing the device to be also easily used in field experiments. Thus, the applications for the system of the invention are numerous and varied, including industrial and agricultural inspection, weather detection, and weapons testing. For example, the device can be used to display two-dimensional temperature maps of an object in real-time. This is very useful in some industries for on-line process control during manufacturing. The imaging spectrometer can also be used for feature extraction and classification tasks such as automated pattern recognition, image enhancement, and scene analysis.

It is noted that the preferred embodiment of the invention uses a multi-directional reflecting element 26 located at the aperture-stop/exit-pupil 29 of the optical system. Thus, the multi-directional reflecting element splits the incident beam from each point in the field stop equally into separate channels. Each separate beam then strikes another reflecting element 28 and passes through a corresponding optical filter in the filter assembly 30 to determine the desired optical characteristics of the wavefront. While this approach is very effective for applications where there is sufficient light, it is not adequate for low-light level applications. Since the light is split equally between all channels, each channel in a two-band system will only have about 50% of the incident light and each channel in a four-band system will only have about 25% of the incident light before passing through the corresponding optical filter.

Figure 9:
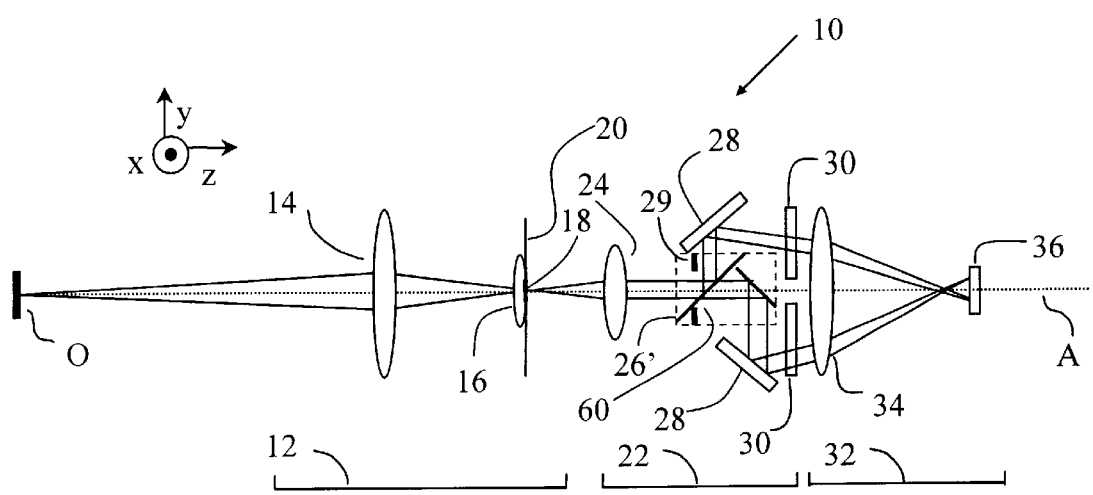
FIG. 9 is an imaging spectrometer according to yet another embodiment of the invention utilizing dichroic filters in the spectral separation subassembly.
Figure 10:
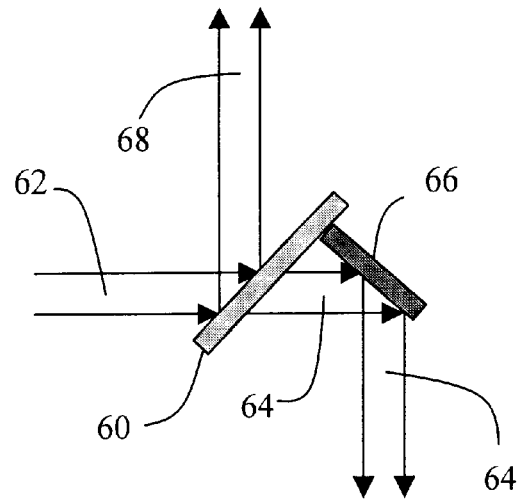
FIG. 10 is a schematic illustration of a dichroic-filter/reflective-mirror assembly used to separate a beam into two distinct wavebands.

In order to improve performance in low light-intensity applications, it is possible to accomplish the beam division function with a multi-directional reflecting element that is specifically spectrally weighted to significantly improve the energy throughput for multispectral imaging tasks. According to this approach, the multi-faceted prism 26 of the preferred embodiment is replaced with a multi-filter assembly 26' comprising multiple dichroic filters 60, as illustrated bidimensionally in FIG. 9. A dichroic filter, a subset of interference filters, is an optical filter that allows transmission of one set of wavelengths and reflects the non-transmitted wavelengths. These filters are easily designed to operate optimally at a non-zero angle of incidence, such as 45 degrees, for example. As illustrated in FIG. 10, a single dichroic filter 60 can be used to divide very efficiently an incident beam 62 into two spectral components, thereby significantly increasing throughput. For example, a long-pass dichroic filter 60 with a cutoff wavelength of 480 nm will transmit a wavefront 64 with all wavelengths greater than 480 nm with an efficiency greater than 90%. The wavefront 64 can then be reflected toward the mirror 28 by another dichroic filter or mirror 66. All the wavelengths less than 480 nm will be reflected with an efficiency also greater than 90% to form a separate wavefront 68 directed to a corresponding mirror 28. Any desired spectral bandpass less than 480 nm can be selected using the appropriate, corresponding optical filter in the filter assembly 30. Likewise, any desired bandpass greater than 480 nm can be selected using the appropriate, corresponding optical filter in the filter assembly 30. Thus, each beam has at least 90% of the light of the incident beam before passing through the optical filters in the filter assembly, which represents a significant improvement over the embodiments of FIGS. 1 and 3. The requirement that the aperture-stop/exit-pupil 29 be located at the multi-directional reflecting element is still present in order to minimize vignetting and ensure that the throughput of the re-imaging subassembly is maximized. As would be apparent to one skilled in the art, the filters 30 are optional in this embodiment because waveband separation is already provided by the dichroic filters 60 and additional filters would be used only to further define waveband selection.

Figure 11:
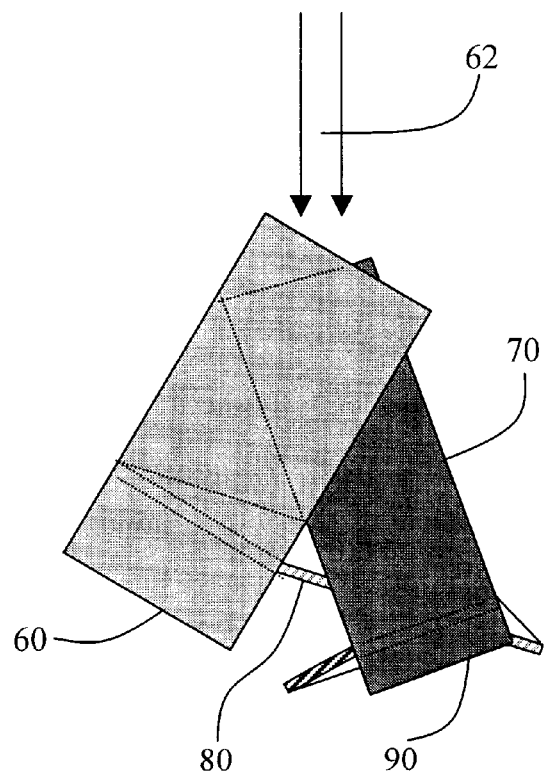
FIG. 11 is a perspective illustration of a system using four dichroic filters (or, alternatively, three dichroids and a reflective mirror) to separate a beam into four distinct wavebands.

This multi-filter concept can be extended to multispectral imaging systems having more than two-bands. For example, a multi-directional reflecting assembly including three dichroic filters (60, 70 and 80) and a mirror or, alternatively, four dichroic filters (60, 70, 80 and 90) is illustrated in FIG. 11. Such an assembly creates four independent beams that have been separated based on the spectral properties of the incident beam. The incident beam 62 is divided more efficiently because it is performed with spectrally sensitive components.

According to another aspect of this improvement, in a four-band system not all the independent beams pass through the same number of filters. Therefore, they are subjected to different degrees of attenuation, which can be exploited advantageously in some applications. For example, if four long-pass dichroic filters 60,70,80,90 are used, with each filter having a reflection/transmission efficiency of about 90%, each of the spectral beams will have a different throughput. The incident beam 62 first strikes filter 60, which might have a cutoff wavelength of 450 nm, for example. Thus, the reflected beam would consist of 90% of all the wavelengths less than 450 nm in the incident beam. The transmitted beam would also have a 90% throughput for wavelengths greater than 450 nm. Assuming that filter 70 is a long-pass dichroic filter with a cutoff wavelength of 550 nm, all wavelengths less than 550 nm would be reflected with 90% efficiency, so that its throughput would be 81% (0.90×0.90) of these wavelengths present in the incident beam 62. The beam transmitted through filter 80 would thus contain 81% of the light in the incident beam 62 having wavelengths greater than 550 nm. Assuming that filter 80 is a long-pass dichroic filter with a cutoff wavelength of 650 nm, it would produce a transmitted beam and a reflected beam with a 72% throughput of the original intensity. Finally, if element 90 is another long-pass dichroic filter, or alternativaly a mirror, used to reflect the beam transmitted by filter 80, a variation in throughput for each spectral channels has been introduced. This can be very helpful when the multi-spectral system of the invention is used with the single-CCD design (illustrated in FIGS. 1 and 9) because in many applications there tends to be more energy in the longer-wavelength spectral bands. As a result, the longer wavelength bands appear brighter than shorter wavelengths bands and the contrast between different bands can be markedly different. By allowing a higher throughput in the lower wavelength channels, as provided by the multi-dichroic assembly of the invention, this effect can be mitigated. If, on the other hand, the opposite effect is desired, one can simply use short-pass filters with the same wavelength cutoffs in reverse order.

Finally, another significant advantage of the multi-dichroic-filter assembly 26' over the interference filter embodiments shown in FIGS. 4 and 5 resides in the fact that no rotation is introduced in the propagation of the beam. The interference-filter embodiments utilize compound tilts of the filters to achieve the separation of the images at the CCD plane. Such compound tilts (i.e., both in the x and y directions) on a reflecting element cause a rotation of the image if an additional reflecting compound with an equal and opposite compound tilt is not added in the optical path. Therefore, in the interference-filter design, the different spectral images are rotated with respect to each other making registration difficult. In the dichroic-filter design, on the other hand, the effect of compound tilts is cancelled, so that no image rotation is introduced.

It is also noted that some applications require accurate, sub-pixel, image registration. This is difficult to achieve with the multiple-detector systems of the invention, such as illustrated in FIG. 3 (note that the same configuration could be used with dichroic-filter embodiments, although not illustrated in the drawings), because multiple-detector systems are further complicated by a source of error that is not present in single-detector systems. If the detector 36 in each channel is placed at a slightly different distance from the imaging lenses 38, there will be slight magnification errors in the resulting images making accurate image registration very difficult. That is, focus errors will lead to magnification changes.

According to yet another aspect of the invention, this error can be minimized using a design approach specifically suited for systems that incorporate multiple detectors. The improvement is achieved by choosing the location of the imaging lenses 38 and of the detectors 36 with respect to the other subassemblies of the system such that the image space is telecentric. As those skilled in the art readily understand, an optical system is telecentric in image space when its chief ray is parallel to the optical axis of the system or, equivalently, when the exit pupil is located at infinity. Since the light beam in the space leading to the re-imaging subassembly of the invention is collimated, the imaging-lens/detector combination can be placed in a variety of acceptable positions. In particular, a condition of telecentricity in image space can be achieved by placing the imaging-lens/detector combination such that the front focal point of the re-imaging subassembly is coincident with the pupil 29 of the optical system. If each channel is so made telecentric in image space, then there will be no first-order magnification changes due to focus errors making accurate image registration easier to accomplish.

Various changes in the details, steps and components that have been described may be made by those skilled in the art within the principles and scope of the invention herein illustrated. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope embraced by any and all equivalent processes and products.

I claim:

1. A multi-spectral two-dimensional imaging spectrometer comprising:

means for producing an intermediate image of an object along an optical axis at a plane substantially coincident with a field-stop aperture of the spectrometer;

means for dividing incident light from said intermediate image into multiple light channels representing predetermined optical states of the intermediate image, wherein said means for dividing incident light comprises at least one dichroic filter disposed along said optical axis; and means for imaging each channel on a detector, thereby producing multiple two-dimensional images of the intermediate image;

wherein said means for producing an intermediate image of an object includes a pupil relaying optic for imaging an exit pupil of preceding optics at a predetermined exit pupil plane along said optical axis, said plane being selected such as to minimize vignetting.

2. The spectrometer of claim 1, further comprising a reflective surface directing each channel toward said means for imaging each channel on a detector.

3. The spectrometer of claim 1, further comprising an optical filter in at least one of said channels toward said means for imaging each channel on a detector.

4. The spectrometer of claim 1, further comprising an aperture stop placed substantially at said exit pupil plane of preceding optics.

5. The spectrometer of claim 1, wherein said means for imaging each channel on a detector consists of a single optical means placed symmetrically on-axis.

6. The spectrometer of claim 1, wherein said means for dividing incident light from said intermediate image into multiple light channels is located at said plane substantially coincident with said exit pupil plane of preceding optics.

7. The spectrometer of claim 1, wherein said for means for imaging each channel on a detector includes multiple optical means for focusing each channel on a separate detector, each of said optical means having a front focal point substantially coincident with said predetermined exit pupil plane along said optical axis.

8. A multi-spectral two-dimensional imaging spectrometer comprising:

means for producing an intermediate image of an object along an optical axis at a plane substantially coincident with a field-stop aperture of the spectrometer;

means for dividing incident light from said intermediate image into multiple light channels representing predetermined optical states of the intermediate image, wherein said means for dividing incident light comprises at least one dichroic filter disposed along said optical axis;

means for providing an aperture stop at a plane in a collimated space along said optical axis, said plane being substantially coincident with said means for dividing incident light from said intermediate image; and means for imaging each channel on a detector, thereby producing multiple two-dimensional images of the intermediate image.

9. The spectrometer of claim 8, further comprising a reflective surface directing each channel toward said means for imaging each channel on a detector.

10. The spectrometer of claim 8, further comprising an optical filter in at least one of said channels toward said means for imaging each channel on a detector.

11. The spectrometer of claim 8, wherein said means for imaging each channel on a detector consists of a single optical means placed symmetrically on-axis.

12. The spectrometer of claim 8, wherein said means for dividing incident light from the intermediate image into multiple light channels is positioned along said optical axis within a collimated space and substantially coincident with an exit pupil of preceding optics selected such as to minimize vignetting.

13. The spectrometer of claim 8, wherein said for means for imaging each channel on a detector includes multiple optical means for focusing each channel on a separate detector, each of said optical means having a front focal point substantially coincident with an exit pupil plane of preceding optics selected such as to minimize vignetting.

14. A multi-spectral two-dimensional imaging spectrometer comprising:

means for producing an intermediate image of an object along an optical axis at a plane substantially coincident with a field-stop aperture of the spectrometer;

means for dividing incident light from said intermediate image into multiple light channels representing predetermined optical states of the intermediate image, wherein said means for dividing incident light comprises at least one dichroic filter disposed along said optical axis; and means for imaging each channel on a detector, thereby producing multiple two-dimensional images of the intermediate image;

wherein said means for imaging each channel on a detector consists of a single optical means placed symmetrically on-axis.

15. The spectrometer of claim 14, further comprising a reflective surface directing each channel toward said means for imaging each channel on a detector.

16. The spectrometer of claim 14, further comprising an optical filter in at least one of said channels toward said means for imaging each channel on a detector.

17. The spectrometer of claim 14, further comprising an aperture stop placed substantially at an exit pupil plane of preceding optics selected such as to minimize vignetting.

18. The spectrometer of claim 14, wherein said means for dividing incident light from the intermediate image into multiple light channels is positioned along said optical axis within a collimated space and substantially coincident with an exit pupil of preceding optics selected such as to minimize vignetting.

* * * * *